Nuttall & Kirkpatrick.
Cutting Screws.
N° 24,153. Patented May 24, 1859.
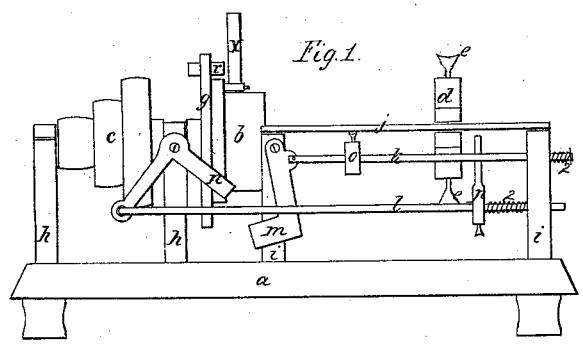
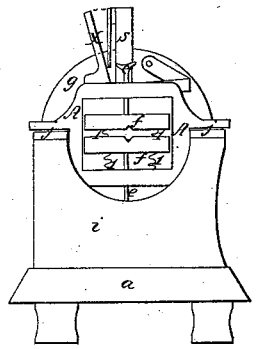
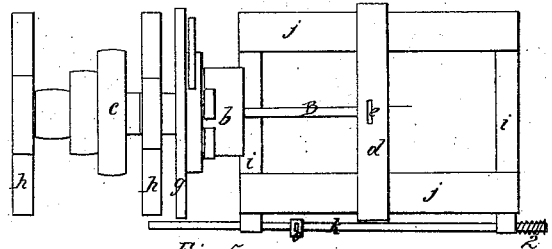
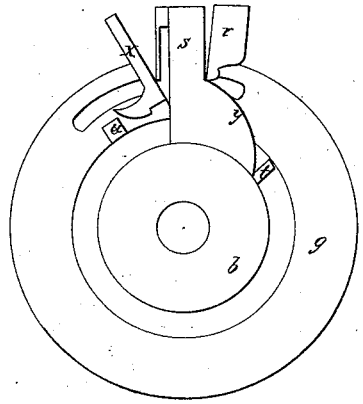
Witnesses;
James J. Johnston
George P. Steck
Inventors;
Richard Nuttall
John Kirkpatrick

UNITED STATES PATENT OFFICE.

R. NUTTALL AND JNO. KIRKPATRICK, OF ALLEGHENY CITY, PENNSYLVANIA.

MACHINE FOR CUTTING SCREWS.

Specification of Letters Patent No. 24,153, dated May 24, 1859.

*To all whom it may concern:*

Be it known that we, RICHARD NUTTALL and JOHN KIRKPATRICK, of the city and county of Allegheny, in the State of Pennsylvania, have invented certain new and useful Improvements in Screw-Cutting Machines; and we do hereby declare that the following is a full and exact description thereof, reference being had to the accompanying drawings and to the letters of reference marked thereon, similar letters referring to similar parts.

The nature of our invention consists in the combination and arrangement of levers, rods, stops and springs with the holding head of a screw cutting machine for the purpose of opening and closing the cutting dies.

In the accompanying drawings, Figure 1 is a side view of a screw cutting machine, with our arrangement for opening and closing the cutting dies. Fig. 2 is an end view of the machine. Fig. 3 is a top view of the machine. Fig. 4 is a face or top view of a chuck for screw cutting, representing the cutting dies closed. Fig. 5 is a face or top view of a chuck for screw cutting, representing the cutting dies opened.

(*a*) is the base of the machine, (*h*) is the running head of the machine, (*i*) are the supports for the slides (*j*) which supports the holding head (*d*) which moves back and forward on the slides. The holding head (*d*) consists of a frame (A), clamps (*f*), springs (1) and regulating screws (*e*); the clamps (*f*) are furnished with grooves in the ends which are fitted to tongues on the inside of the frame (A). The whole arrangement of the holding head is clearly shown in Fig. 2.

(*c*) is the driving pulley, (*g*) is the face plate of the running head of the machine, to which is attached the chuck (*b*) and an eccentric lever (*r*) which is used for the purpose of closing the cutting dies.

(*s*) is a lever which is attached to the chuck, and so connected with the cutting dies that by a back and forward movement it will open and close the dies.

(*u*) is a regulating stud which is used in connection with the spring catch (*x*) for the purpose of holding the lever (*s*) in its desired position.

(*y*) is a cam and (*t*) a locking stud which are used in connection with the eccentric lever (*r*) for the purpose of operating lever (*s*); the lever (*n*) which is attached to the running head (*h*) is used in connection with the rod (*l*), stop (*p*), spring (2), sliding head (*d*) and the eccentric lever (*r*) for the purpose of closing the cutting dies. The lever (*m*) which is attached to the support (*i*) next to the chuck, is used in connection with the rod (*k*), spring (2), stop (*o*) and the sliding head (*d*) for the purpose of opening the cutting dies.

(B) in Fig. 2 represents a bolt secured in the holding or sliding head (*d*) and entering the chuck. The stops (*o*) and (*p*) are secured to the rods at any desired point by means of thumb screws as seen in Fig. 1.

We wish it to be clearly understood that we do not confine our arrangement for opening and closing the cutting dies, to any one particular chuck or machine, for it will operate any chuck or machine which has cutting dies that can be operated by a lever or levers.

The operation of our improvement is as follows: Having the various parts arranged as represented in the accompanying drawings and the machine put in motion, as the thread is cut on the bolt the sliding or holding head (*d*) is drawn forward until it comes in contact with the stop (*o*) which will throw the lever (*m*) forward toward the chuck and thereby bring it in contact with the spring catch (*x*) which will be relieved from the regulating stud (*u*) and be pressed back against the lever (*s*) which will by its backward motion relieve the cutting dies from the work without the machine; when the chuck with its parts will appear as represented in Fig. 5. The dies are closed by drawing the sliding head or holder (*d*) back until it comes in contact with the stop (*p*) which will throw the lever (*n*) in contact with the eccentric lever (*r*) which will press on the cam (*y*) which will press the lever (*s*) forward until the spring catch (*x*) grasps the regulating stud (*u*) and the eccentric lever (*r*) comes in contact with the locking stud (*t*) which will hold it until it is again relieved by coming in contact with the lever (*m*) which opens the cutting dies. When the cutting dies are closed and ready for work, the chuck with its parts will appear as represented in Fig. 4. It will be observed that the springs (2) on the rods (*k*) and (*l*) are used for the purpose of holding the levers (*m*) and (*n*) back and free from the chuck and its parts and the eccentric lever (r).

Having thus described the nature, construction and operation of our improvement in screw cutting machines, what we claim as of our invention and desire to secure by Letters Patent of the United States is—

1. The combination and arrangement of the levers (m) and (n), rods (k) and (l), stops (o) and (p), and springs (2) with the holding or sliding head (d) and eccentric lever (r), the whole being combined, arranged and constructed in the manner described and for the purpose set forth.

2. The use of the sliding or holding head (d) and eccentric lever (r) when used for the purpose of opening and closing cutting dies in chucks for screw cutting.

RICHARD NUTTALL.
JOHN KIRKPATRICK.

Witnesses:
JAMES J. JOHNSTON,
GEORGE P. STECK.